US008280825B2

(12) United States Patent
Friedman

(10) Patent No.: US 8,280,825 B2
(45) Date of Patent: Oct. 2, 2012

(54) SYSTEM FOR MAKING FINANCIAL GIFTS

(76) Inventor: Morris Friedman, Encino, CA (US)

( * ) Notice: Subject to any disclaimer, the term of this patent is extended or adjusted under 35 U.S.C. 154(b) by 382 days.

(21) Appl. No.: 12/544,183

(22) Filed: Aug. 19, 2009

(65) Prior Publication Data
US 2010/0049632 A1 Feb. 25, 2010

Related U.S. Application Data

(60) Provisional application No. 61/090,608, filed on Aug. 20, 2008, provisional application No. 61/234,965, filed on Aug. 18, 2009.

(51) Int. Cl.
G06Q 30/00 (2012.01)
G06Q 99/00 (2006.01)
(52) U.S. Cl. ........................ 705/500; 705/26.1
(58) Field of Classification Search ............... 705/14.51, 705/26.1, 500
See application file for complete search history.

(56) References Cited

U.S. PATENT DOCUMENTS

| 5,513,117 | A | 4/1996 | Small |
| 5,870,718 | A | 2/1999 | Spector |
| 6,288,319 | B1 | 9/2001 | Catona |
| 6,295,058 | B1 | 9/2001 | Hsu et al. |
| 6,321,211 | B1 | 11/2001 | Dodd |
| 6,360,139 | B1 | 3/2002 | Jacobs |
| 6,609,106 | B1 | 8/2003 | Robertson |
| 6,618,753 | B2 | 9/2003 | Holland et al. |
| 6,669,088 | B2 | 12/2003 | Veeneman |
| 6,793,130 | B2 | 9/2004 | Veeneman |
| 6,965,912 | B2 | 11/2005 | Friedman et al. |
| 7,010,512 | B1 | 3/2006 | Gillin et al. |
| 7,013,292 | B1 | 3/2006 | Hsu et al. |
| 7,039,601 | B2 | 5/2006 | Gary |
| 7,130,817 | B2 | 10/2006 | Karas et al. |
| 7,266,533 | B2 | 9/2007 | Karas et al. |
| 7,315,834 | B2 | 1/2008 | Martineau et al. |
| 7,455,226 | B1 | 11/2008 | Hammond et al. |
| 7,502,749 | B2 | 3/2009 | Ganesan et al. |
| 7,668,619 | B2 * | 2/2010 | Torian ........................... 700/233 |
| 7,702,587 | B2 * | 4/2010 | Nguyen et al. .................. 705/41 |
| 2002/0087427 | A1 | 7/2002 | Ganesan et al. |

(Continued)

OTHER PUBLICATIONS

Anon., "Holiday Giving 'Your Way' With Burger Bucks® Gift Certificates now Online at www.burgerking.com," PR Newswire, Nov. 8, 1999.*

(Continued)

Primary Examiner — Nicholas D Rosen
(74) Attorney, Agent, or Firm — Larry K. Roberts

(57) ABSTRACT

A computer-implemented method and system for electronic gift giving. The method includes providing an internet site for access by a giver via a giver device, prompting the giver to enter giver identification information, and storing the giver identification information in a data store. The giver is prompted to enter recipient information, and the recipient information is stored in the data store. The giver is prompted to select from a plurality of composition templates, and create a composition based on the selected composition template. The giver is prompted to enter a value of a monetary gift, and the entered value is stored in association with the created composition for delivery to a recipient. An embodiment of the invention may include interest being accrued based on the value of the monetary gift. In another embodiment, at least one sponsor pays a fee for an advertising message to appear in the composition.

34 Claims, 11 Drawing Sheets

U.S. PATENT DOCUMENTS

| | | |
|---|---|---|
| 2002/0087465 A1 | 7/2002 | Ganesan et al. |
| 2003/0085913 A1* | 5/2003 | Ahmad et al. ................ 345/730 |
| 2004/0052505 A1* | 3/2004 | Ahmad et al. ................. 386/69 |
| 2004/0177114 A1 | 9/2004 | Friedman et al. |
| 2005/0154675 A1 | 7/2005 | Johnson, Jr. |
| 2006/0036681 A1 | 2/2006 | Friedman et al. |
| 2006/0160615 A1* | 7/2006 | Boyd ............................. 463/30 |
| 2006/0204214 A1* | 9/2006 | Shah et al. ...................... 386/54 |
| 2007/0038716 A1 | 2/2007 | Saguy |
| 2011/0213675 A1* | 9/2011 | Friedman .................... 705/26.7 |

OTHER PUBLICATIONS

Anon., "IdeaEdge Launches Online Gift Cards and Greeting Cards for American Idol™ Gifts," Business Wire, Dec. 4, 2007.*

* cited by examiner

SYSTEM FOR MAKING FINANCIAL GIFTS

CROSS-REFERENCE TO RELATED PATENT APPLICATIONS

This application claims priority to and the benefit of U.S. Provisional Patent Application No. 61/090,608, filed on Aug. 20, 2008, and U.S. Provisional Patent Application No. 61/234,965, filed on Aug. 18, 2009, in the United States Patent and Trademark Office, the entire contents of which are incorporated herein by reference.

FIELD OF THE INVENTION

The present invention relates to a method and system for making financial gifts, and more particularly to a method and system for making financial gifts associated with a customized electronic message.

BACKGROUND

The process of giving a gift can be stressful, time-consuming, and frustrating. A gift giver may experience stress as a result of attempting to determine an appropriate and desirable gift to present to the intended recipient, and the process of procuring the gift may require more time than the giver may reasonably devote to the process. For long distance giving, the giver often must travel to a post office or other shipping business, wait in line, and spend additional money beyond the cost of the gift to ensure the delivery of the gift to the recipient, which can be a stressful and time-consuming experience.

Further, the gift-giving experience may be frustrating for the giver and the recipient if the recipient is not pleased with the selected gift. In this situation, the giver will be frustrated because the investment of time and money in the gift-giving process did not yield the desired result of pleasing the recipient. Further, the recipient is frustrated, and possibly embarrassed, because the gift is not desired, and the recipient must either pretend to be pleased with the gift, or honestly report to the giver that the gift is unwanted so that the gift may be returned or exchanged for a more desirable item. This entails more wasted time, effort, and expense. Additionally, the earth's environment is negatively impacted as a result of producing and delivering the gift, which may be unwanted.

Conventional gift cards may not be a suitable solution to these problems. Giving conventional gift cards can feel impersonal because they are not customized or personalized for the particular recipient. Further, the gift card must still be physically shipped to the recipient, which takes additional time, negatively impacts the environment, includes the risk of fraud or being lost in shipment, and may require the recipient to shop at a particular store, which may also go out of business.

Accordingly, there is a need for a new method of gift giving that is personalized, efficient, environmentally friendly, and pleasing to both the giver and the recipient.

SUMMARY OF THE INVENTION

The present invention relates to a method and system for making financial gifts, and more particularly to a method and system for making financial gifts associated with a customized electronic message. The method and system include customizable composition templates that may be utilized to easily create custom compositions, including customization with video digital editing systems, that are electronically delivered and feature audio, pictures, and/or video clips. Further, monetary gifts may accompany the compositions and may be electronically transferred to the recipient to be utilized for purchases desired by the recipient. Also, the method and system are environmentally friendly because no energy or resources are expended in the shipping, manufacturing, or delivery of an unwanted gift. Therefore, the method and system of the present invention provide an opportunity to give gifts that are personalized, efficient, environmentally friendly, and likely to please the recipient.

In one particular embodiment of the invention, a giver identifies a registered recipient profile or enters recipient information to create a profile for an unregistered recipient. The system offers options to create a video composition, create a jigsaw puzzle, or create a craft. Next, the giver identifies how much money he or she wishes to send and what the occasion is. Here, the system offers options to reveal the gift amount to the recipient or keep the gift amount anonymous. Next, the system recommends possible composition templates. The giver then chooses a template.

In the current example, if the giver chooses a particularly famous athlete, the system provides the option of making a composition or selecting from a collection of pre-made compositions. Further, the giver may select a personal download. Also in the current example, the giver selects the soundtrack and continues by selecting clips or pictures from a gift dollar value amount and places them in order on a horizontal editing bar. The system may place transition graphics, which may be sponsored, between scenes. The giver may then select sound effects and place them where desired. The system may also offer options to re-randomize the gift dollar amount matrix. Once the giver completes the clips or pictures and sound selection, the system offers opening and closing title card options. Here, the giver may re-edit the composition, or the giver approves the composition and the system may offer or automatically apply sub-sponsor coupon options.

An embodiment of the present invention provides a computer-implemented method for electronic gift giving, the method including: providing an internet site for access by a giver via a giver device; prompting the giver to enter giver identification information; storing the giver identification information in a data store; prompting the giver to enter recipient information; storing the recipient information in the data store; prompting the giver to select from a plurality of composition templates; creating a composition based on the selected composition template; prompting the giver to enter a value of a monetary gift; and storing the entered value in association with the created composition for delivery to a recipient.

Interest may accrue based on the value of the monetary gift. The interest may be added to the value of the monetary gift.

At least one sponsor may pay a fee for a product placement or an advertising message to appear in the composition. The giver may increase the value of the monetary gift by including sponsored links and offers. A composition template may be suggested based on demographic information. The composition template may include a puzzle, stop-motion creation of a virtual gift, and/or a scenic environment with visual elements.

The method may also include: sending a notification to the recipient; displaying the composition and the value of the monetary gift on a recipient device; and providing the recipient access to the monetary gift.

The notification may include an Internet link for accessing the composition.

The method may also include: prompting the recipient to select an amount to transfer; prompting the recipient to select a transfer destination, wherein the transfer destination is selected from the group consisting of a bank account, a physical check, and a transaction card account; and authorizing transfer of the amount to the transfer destination.

The creating of the composition may include customizing the selected composition template via one or more of visual images and audio elements.

The method may also include: determining whether a lockbox feature has been selected for the monetary gift; and restricting access to the monetary gift until an unlock date if the lockbox feature has been selected.

The method may also include: receiving a lockbox release request from the recipient; forwarding the lockbox release request to the giver; and releasing the monetary gift, revising the unlock date, or reinstating the unlock date, in response to a command by the giver.

Each composition template may include a plurality of visual images with an associated monetary value, and the method may further include: prompting the giver to select one or more of the visual images, wherein a value of the monetary gift is the sum of the monetary values associated with the selected visual images.

The creating of the composition may include: determining a soundtrack duration of a selected soundtrack; determining an opening title duration; determining a number of selected visual images; and determining a visual image display duration based on the number of selected visual images, the opening title duration, and the soundtrack duration.

The method may further include: comparing the visual image display duration with a predetermined range; and displaying the visual images multiple times or adjusting the visual image display duration utilizing video time compression and/or expansion if the visual image display duration is greater than the predetermined range.

Another embodiment of the present invention provides a gift giving system including: an Internet interface; a giver account database accessed through the Internet interface by a giver and storing giver information; a recipient account database accessed through the Internet interface by a recipient and storing recipient information; and a composition template database storing a plurality of composition templates; and a server coupled to the giver account, recipient account, and composition template database, wherein the server is configured to create an electronic gift including a customized composition based on a selection of one of the plurality of composition templates, and a monetary value for the gift, and deliver the electronic gift to the recipient over the Internet interface.

The composition may include one or more of visual images and audio elements.

Another embodiment of the present invention provides a server for a gift giving system, the server including: a processor; and a memory operably coupled to the processor storing program instructions therein, the processor being operable to execute the program instructions, the program instructions including: providing an Internet site for access by a giver via a giver device; prompting the giver to enter giver identification information; storing the giver identification information in a device store; prompting a giver to enter recipient information; storing the recipient information in the device store; prompting the giver to select from a plurality of composition templates; creating a composition based on the selected composition template; prompting the giver to enter a value of a monetary gift; and storing the entered value in association with the created composition for delivery to a recipient.

BRIEF DESCRIPTION OF THE DRAWINGS

These and other features and advantages of the present invention will be appreciated as the same become better understood with reference to the specification, claims, and appended drawings wherein:

DETAILED DESCRIPTION

The detailed description set forth below in connection with the drawings is intended as a description of the presently preferred embodiments of a method and system for making financial gifts provided in accordance with the present invention and is not intended to represent the only forms in which the invention may be constructed or utilized. It is to be understood that the same or equivalent functions and structures may be accomplished by different embodiments that are also intended to be encompassed within the spirit and scope of the invention. As denoted elsewhere herein, like element numbers indicate like elements or features. Though steps of the method may be illustrated in one order, unless explicitly stated, the steps of the method of the present invention are not limited to any particular order and some of the steps may be optional.

Figure 1:
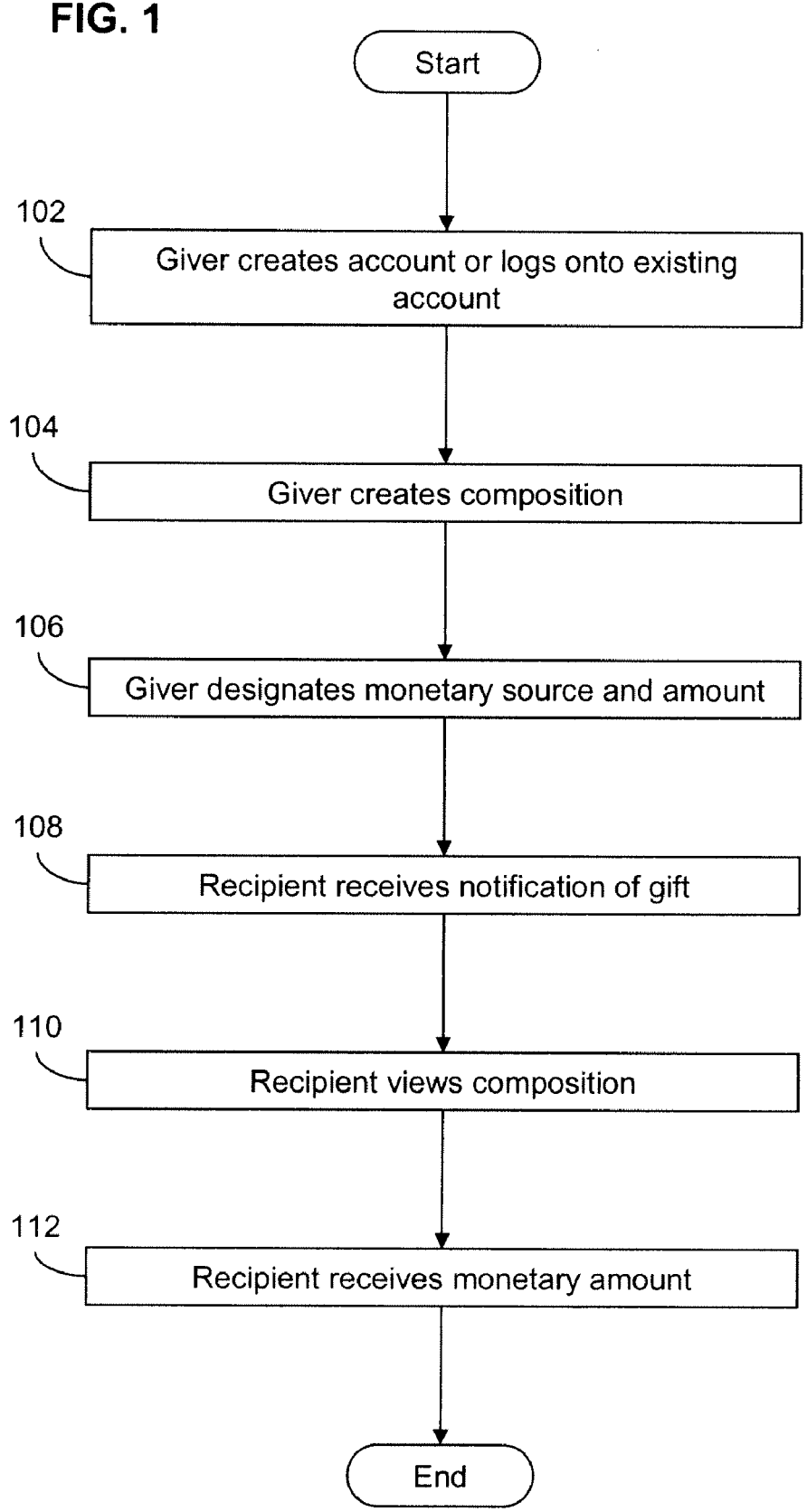
FIG. 1 is a flow chart illustrating a method for making financial gifts according to an embodiment of the present invention.

FIG. 1 depicts a method of making financial gifts according to an embodiment of the present invention. This method may be utilized by a giver who desires to give a gift that includes both a monetary gift and a composition representing a customized greeting display, which may be similar to an edited slide show or video presentation. The composition may create a virtual experience which the giver believes the recipient will enjoy and may suggest how the monetary gift might be utilized. This method provides a giver with an easy, convenient, and creative means of conveying a meaningful message, while also bestowing a cash gift that may be utilized in any way that the recipient chooses. Also, this method benefits the environment by reducing or eliminating the manufacture, packaging, marketing, shipping, stocking, wrapping, and the resources necessary for delivery (and possibly return) of unwanted gifts to the recipient, or the energy expended to shop for and deliver gifts even if they are well-received.

Further, an embodiment of the present invention provides entertainment for the giver. Here, the giver may experience fun and enjoyment during the process of customizing the display. The giver also has the opportunity to express himself or herself creatively during this process. Further, an embodiment of the present invention allows the giver to increase the value of the cash gift by including sponsored links and offers. Here, the value of the gift may be increased by the addition of coupons or rebates to the gift. In fact, providing sponsorship opportunities, with benefits offered to the giver and/or recipients, may occur at virtually any point in the process of the invention.

Figure 2:
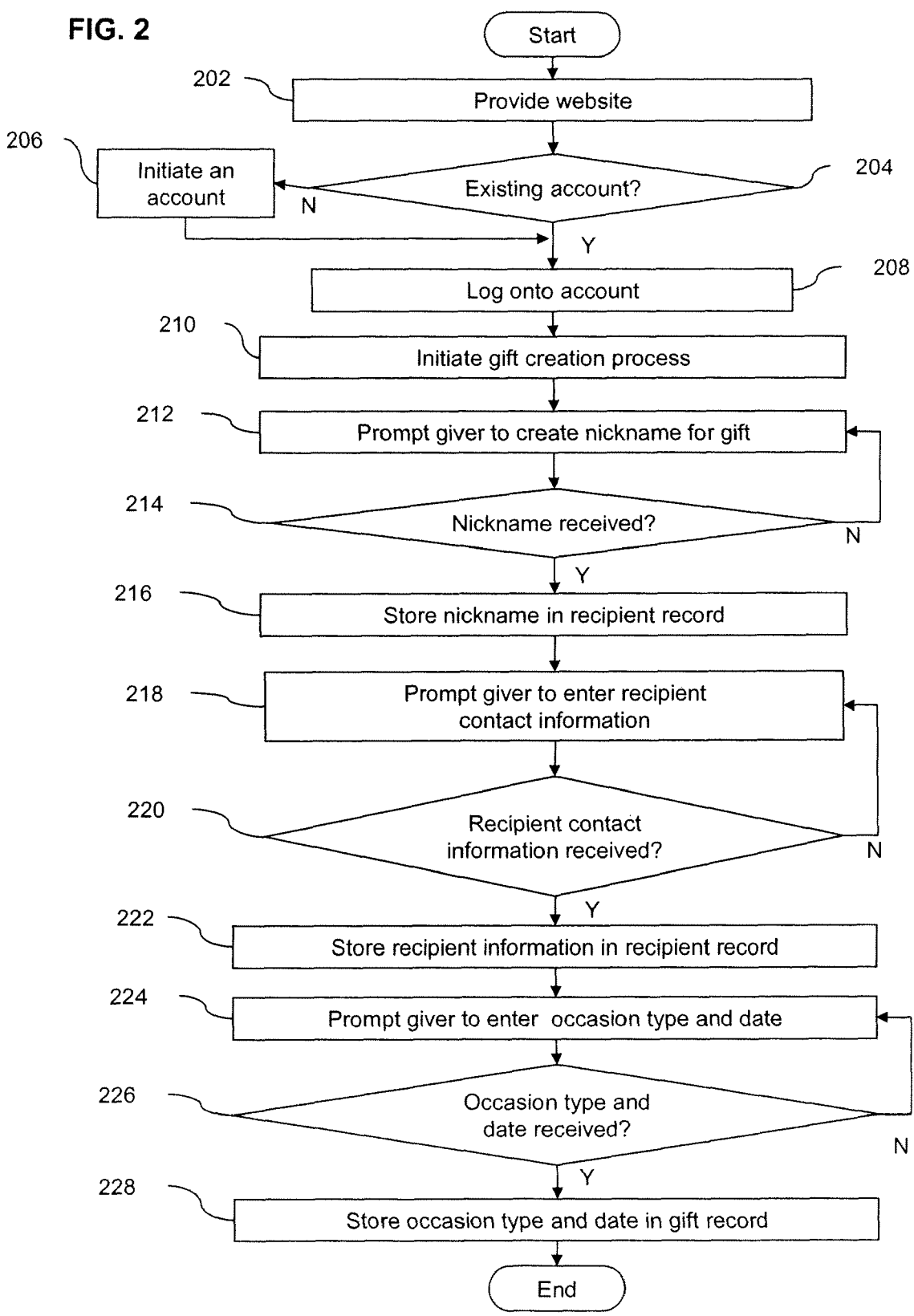
FIG. 2 is a flow chart illustrating a method by which an account is accessed according to another embodiment of the present invention.

A giver creates an account or logs onto an existing account 102 to access the system. Here, the giver creates a composition 104 that may be customized for an intended recipient. The giver designates a monetary source and amount 106 to specify the value of the monetary gift and the account from which the transfer will proceed, such as a bank account or transaction card. Transaction cards may include, but are not limited to, debit cards, credit cards, smart cards, etc. Next, the recipient receives a notification of the gift 108, which also provides some method of accessing the gift. Finally, the recipient views the composition 110 and receives the monetary gift 112, which may be held on account until transferred to a check, a bank account, or a transaction card. At this time, accrued interest may also be transferred to the recipient FIG. 2 depicts a method by which an account is accessed 102, as shown in FIG. 1, according to an embodiment of the present invention. Here, the system provides a website 202, and a giver selects whether an account already exists 204 for the giver. If an account does not already exist, the giver is prompted to initiate an account 206. To initiate or create an account, the system prompts the giver to enter information, such as name, address, email address, phone numbers, etc. If an account already does exist, the giver is prompted to log onto the account 208. Once the giver has logged on to the account 208, the system initiates the gift creation process 210, and prompts the giver to create a nickname for the current gift 212, such as "Uncle Ernie's Retirement" or "Jimmy's 5th Birthday". If no nickname is received, the system again prompts the user to create a nickname, or the system may assign a nickname based on the recipient information that is entered.

Once a nickname is received 214, the system stores it in a recipient record 216 in a recipient account database, and prompts the giver to enter recipient contact information 218, which may include recipient's name, physical address, email address, phone numbers, nickname, etc. The system may attempt to verify the recipient email address as active, and may prompt the giver to enter another email address if the initial email address is not active. If the recipient contact information is not received, the system again prompts the giver to enter it. Once the recipient contact information is received 220, the system stores it in the recipient record 222 in the recipient account database. The system prompts the giver to enter an occasion type and date 224. The occasion type may include categories such as birthday, wedding, graduation, just because, or a blank field. If the occasion type and date are not entered, the system again prompts the giver to enter it. Once the occasion type and date is received 226, the system stores it in the recipient record. The system may or may not charge a setup fee.

Figure 3:
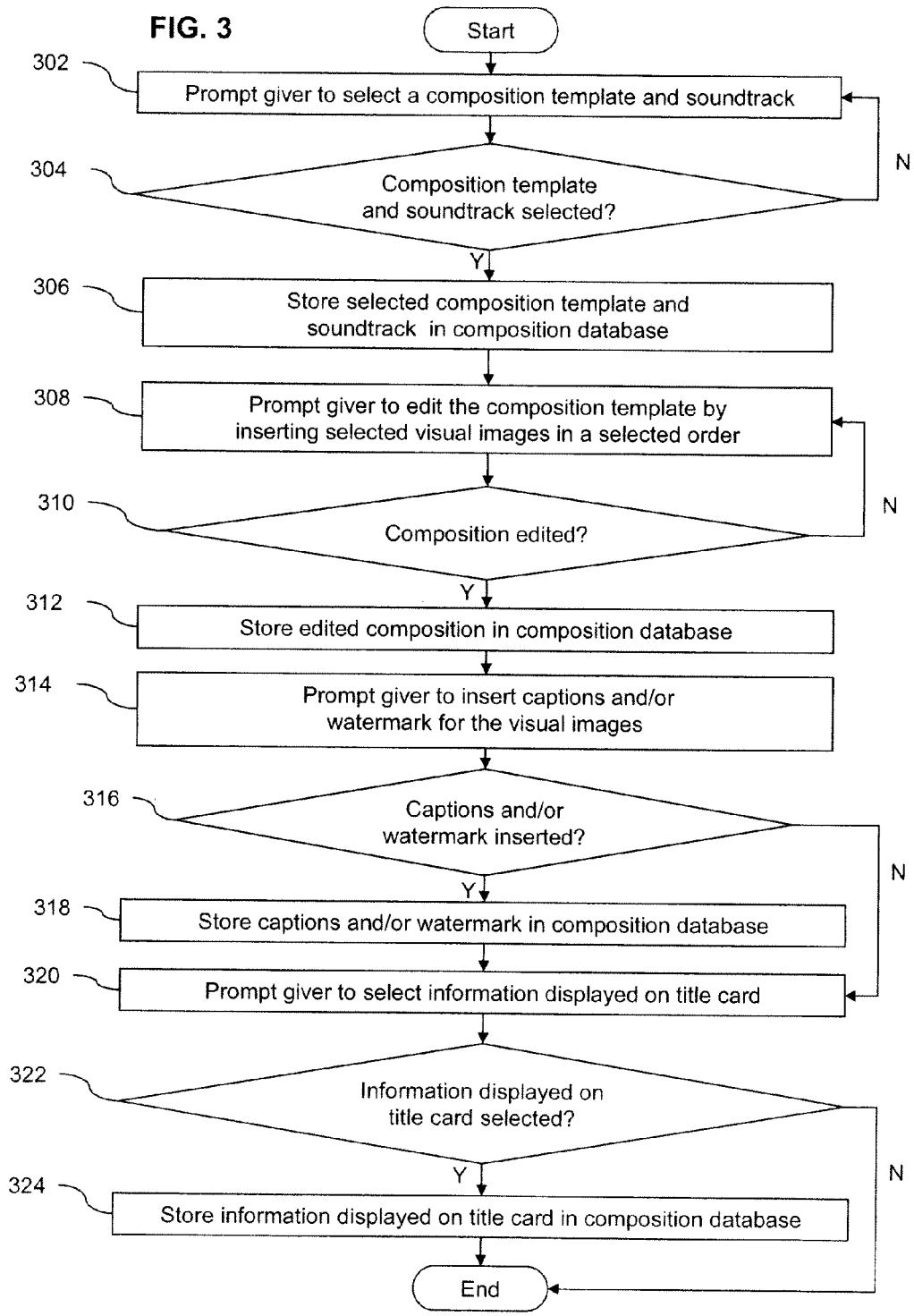
FIG. 3 is a flow chart illustrating a method by which a composition is created according to another embodiment of the present invention.

FIG. 3 depicts a flow chart illustrating a method by which a composition is created 104, as shown in FIG. 1, according to another embodiment of the present invention. Once the initial information is entered, the system prompts the giver to select a composition template from the composition template database and a soundtrack 302. Here, the composition template may be occasion specific (e.g., birthday, housewarming, or graduation), tailored to a recipient's interests (e.g., cats, baseball, or musicals), related to the type of purchase the giver suggests the recipient to make with the gift (e.g., school tuition, dinner at a fancy restaurant, or a spa experience), or may encompass other virtual experiences or types of themes, such as travel or education. The soundtrack may be chosen from a music library vendor, such as iTunes, which may require a separate fee, or it may be uploaded by the giver. Further, top picks of soundtracks used for the selected composition template may be displayed to help the giver to choose. If the composition template and the soundtrack are not selected, the system again prompts the giver to select them.

Once the composition template and soundtrack have been selected 304 and stored in the composition database 306, the system prompts the giver to edit the composition template by inserting visual images, such as selected pictures and/or video clips, in a desired order 308. The giver may also insert specific still images, other video, animation, computer generated images, transitions (which may be a sponsored advertising message which a sponsor purchases for a fee), title cards, graphic effects, and superimposed images. One method of editing the composition template may include graphically representing the soundtrack as a horizontal line. The giver may then select visual images to be dragged and dropped into a desired position along the horizontal line. Alternatively, the giver may select a pre-made composition.

In an embodiment of the present invention, the audio soundtrack may be selected from template-specific choices.

In an embodiment of the present invention, the audio soundtrack may be selected from a song sampling provided by outside vendors, which may have an associated fee. Also, the system may have propriety audio that may be utilized in the composition.

In an embodiment of the present invention, the giver may generate and/or upload an audio soundtrack and/or video components.

In an embodiment of the present invention, the giver may edit a template from a sponsor that provides audio and/or visual elements, which may include elements that are submitted by the sponsor.

In an embodiment of the present invention, a template is suggested to the giver based on demographic information entered by the giver.

Once the giver indicates that the composition has been edited 310, the system stores it in a composition database 312. Next, the system prompts the giver to optionally insert captions, including both text and audio captions, and/or a watermark for the visual images. If the giver optionally chooses to insert captions and/or a watermark for the visual images 316, the captions and/or watermarks are stored in the composition database 318. Additionally, the giver may be prompted to optionally select or enter information to be displayed on a title card at the beginning and/or end of the composition 320, which may include personalized information and greetings. If this information is entered 322, the system stores it in the composition database 324. Optionally, the information on the title card may be automatically chosen and inserted. Also optionally, the giver may choose to print out the composition or download the composition to a computer.

Optionally, the system may prompt the giver to preview or select coupon(s) to be inserted at the end of the composition. Here, special offers or discount coupons may be displayed for use at the end of the display of the composition. For example, coupons or offers may be chosen by the giver, based on the giver's understanding of the type of coupons or offers that may be desirable to the recipient. Alternatively, coupons or offers may be selected based on the template chosen by the giver, such as a cat magazine coupon for a template related to cats. Further, coupons or offers may be chosen based on the gift-giving occasion, may be chosen by the system based on recipient demographic information, or may be chosen randomly. Also optionally, the giver may be prompted to select whether or not coupons or offers will be displayed. Coupons that are displayed may be printed for future use, may have a internet link to a website for redemption, or may be redeemed by other methods.

In an embodiment of the present invention, the sponsor may be able to specifically market to a target audience because the marketing information, including coupons or offers, is presented to recipients based on the demographic information entered, which increases the likelihood that they will be interested in the particular good or service that the sponsor is offering. Further, the attention of the recipient is focused on the message of the sponsor because the recipient desires to determine what cash gift, as well as what sponsored offers, he or she has received, and the message appears to be endorsed by the giver. Additionally, the sponsor benefits from the website link or other sponsor information being available to the recipient, because the recipient may be more likely to purchase the goods or services of the sponsor.

In an embodiment of the present invention, the sponsor may be charged a set-up and/or per-click fee for the inclusion of the sponsors information with the composition.

In another embodiment of the present invention, the giver may optionally select to have transitions between pictures correspond to the beat of the music of the selected soundtrack. Here, the order of the pictures may be selected by the giver or the order may be placed in a random order by the system.

In another embodiment of the present invention, the giver may upload visual images from any source for inclusion in the composition.

In an embodiment of the present invention, the templates may be utilized with scenic environments that have regions for visual elements, selected by the giver or pre-chosen, to be displayed. For example, the visual elements may be displayed on gift boxes arranged under a Christmas tree.

In another embodiment of the present invention, the composition template provides a selection of components, motion clips, and drawing tools that allow the giver to perform a task virtually or display a virtual gift. The result may be similar to stop-motion animation. For example, a giver may construct a custom car, build a model of a sailing ship, design a baby outfit, arrange a bouquet, design a wedding gown, bake and decorate a cake, or draw a picture. In the example where a bouquet is arranged, the giver may select a vase to appear. Next, the giver may select individual flowers to be positioned in the vase in particular locations. Finally, the giver may decide to tie a ribbon around the vase. The composition may then display the vase, then each flower as it was selected, and then the ribbon, so that it appears that the flower arrangement is being arranged before the recipient.

In another embodiment of the present invention, the composition template provides one or more pictures that the giver may select for display in the form of a jigsaw puzzle. Here, any number of pictures may be utilized, but the process will be described with four pictures. The first picture is displayed on the jigsaw puzzle pieces. Optionally, a reference picture may also be displayed for the recipient to use as a reference to assemble the puzzle. The recipient begins to assemble the jigsaw puzzle. After one quarter of the jigsaw puzzle is assembled, the picture displayed on the puzzle pieces and the partially assembled jigsaw puzzle changes to a second picture. The recipient continues to assemble the jigsaw puzzle based on the second picture. After one half of the jigsaw puzzle has been assembled, the picture displayed on the puzzle pieces and the partially assembled jigsaw puzzle changes to a third picture. The recipient then continues to assemble the jigsaw puzzle based on the third picture. After three quarters of the jigsaw puzzle is assembled, the picture displayed on the puzzle pieces and the partially assembled jigsaw puzzle changes to a fourth and final picture. The recipient finishes assembling the jigsaw puzzle based on the fourth picture. When the recipient has completed the puzzle, the monetary gift is announced to the recipient. Further, there may be a fee associated with the puzzle.

In another embodiment of the present invention, the jigsaw puzzle composition template has a "cheat" button that causes the puzzle pieces to be placed, one by one, in the correct location when it is clicked. In another embodiment, the number of puzzle pieces can be related to the monetary value of the gift. For example, one puzzle piece might represent one dollar, so that a twenty piece puzzle has an associated monetary gift value of $20.

In an embodiment of the present invention, the gift may be a traditional e-card or a third party video game.

In another embodiment of the present invention, the gift may be a movie preview, cartoon, or film short.

In an embodiment of the present invention, the audio and/or visual elements may be purchased from a third party vendor by the giver.

In an embodiment of the present invention, sponsor coupons and/or offers may be related to a chosen template or to any of the options encountered in the preparation of a composition. For example, the template may display a customized fashion show of the current catalog of a sponsor that offers apparel and cosmetics. The related coupons and/or offer may include an internet link to the sponsor's website, free-samples of cosmetics, and nearest store directions. In another example, the template may display food items offered by a sponsor that is a restaurant. Further, the template may include scenes of a location, such as Paris, for a related restaurant, such as a French restaurant. For example, scenes of Italy, including gardens and harvests, may be shown for a pizzeria, along with scenes of pizza preparation and recipes. The related coupons and/or offers may include free dessert coupons, a link to a site to make reservations at the restaurant, and directions to the nearest location. In another example, a template that displays views of a golf course may have multiple sponsors, such as a golf course offering discounts at the starter's window or pro-shop and an equipment manufacturer offering discounts on golf balls.

In an embodiment of the present invention, a primary giver establishes a mailbox where content is compiled for the composition. For example, the audio soundtrack could include a conference call with selectable music tracks to facilitate, for example, family members singing happy birthday. In another example, video may be compiled from outside sources for assembly into a composition. In an embodiment of the present invention, a fee may be charged for this service.

In one particular embodiment of the invention, a giver identifies a registered recipient profile or enters recipient information to create a profile for an unregistered recipient. The system offers options to create a video composition, create a jigsaw puzzle, or create a craft. Next, the giver identifies how much money he or she wishes to send and what the occasion is. Here, the system offers options to reveal the gift amount to the recipient or keep the gift amount anonymous. Next, the system recommends possible composition templates based on the recipient's demographic information (e.g., age, occasion, and zip code), past templates used for the recipient, and/or preferences the recipient may have entered on a profile page. The giver then chooses a template from a full list of categories, such as sports, travel, museums, cooking, fashion, and kids. For example, if the giver chooses sports templates, a sports menu is displayed with categories, such as baseball, football, basketball, car racing, and Olympics. Here, if the giver chooses baseball, a baseball menu is displayed, which may include teams, players, all-star games, world series, and Hall of Fame players. If the giver chooses teams from this menu, a list of baseball teams is displayed. If the giver chooses a particular team, a menu for that team is displayed, which may include players, all star games, world series, and Hall of Famers. If the giver chooses players, a players menu is displayed, which may include a list of all players (sponsored by a first sponsor), hall of famers (sponsored by a second sponsor), particularly famous players (each of which may be sponsored by a sponsor), or the option to build an "All Time Greats Team."

In the current example, if the giver chooses a particularly famous player, the system provides the option of making a composition or selecting from a collection of pre-made compositions. If the giver chooses to make a composition of his or her own, the system provides one clip or picture of the famous player for each dollar being gifted to the recipient. Alternatively, the system randomly fills a changeable matrix of clips, each of which has a specific dollar value attached or pictures of the famous player. Next, the giver selects an audio track from a recommended list (e.g., which may include the five most popular tracks), or the giver may choose a different soundtrack so that the system performs an on-line search of music sites and offers results including source location and cost. Further, the giver may select a personal download, where the options provided include creating a personal recording (which may require a fee and require the giver to call a telephone number and enter a code), or create a group conference call with background music (which may require a fee and require a telephone call using a code). Here, for example, the personal recording file may be retained for a specified period, e.g., 48 hours, in the system pending group recording completion, and allow the giver to sign back into the system and select a pending gift from a user profile page to continue creation of the gift.

Further in the current example, the giver completes the soundtrack and continues by selecting clips or pictures from a dollar value matrix and places them in order on a horizontal editing bar. The system may place transition graphics, which may be sponsored, between scenes. The giver may then select sound effects and place them where desired on the editing bars, e.g., a medium crowd roar, a maximum crowd roar, the crack of a bat, a "holy cow" soundbite, and/or a "get yer peanuts" soundbite. The system may also offer options to re-randomize the dollar amount matrix (e.g., for a certain value per "lever pull") or purchase additional pictures or clips (e.g., fees might be 5 visual images for 25 cents, 12 visual images for 50 cents, or 30 visual images for a dollar). Once the giver completes the clips or pictures and sound selection, the system offers opening and closing title card options, which the giver completes. The system may further offer editing options of edit to time and edit to music, and the system executes this decision and previews the composition. Here, the giver may re-edit the composition, or the giver approves the composition and the system may offer or automatically apply sub-sponsor coupon options. The system then offers a rounding out gift dollar amount options (e.g., −10% or +100%), a lockbox option, and/or delivery options, such as create a gift wrap for the gift (where a demonstration may be viewed and/or a fee may be charged which may be donated to an environmentally focused organization) or present composition in a scenic environment option, such as a birthday, wedding, holiday, or a certain location (where a demonstration may be viewed and/or a fee may be charged which may be donated to a charitable organization). Finally, the system requests delivery date and time.

Figure 4:
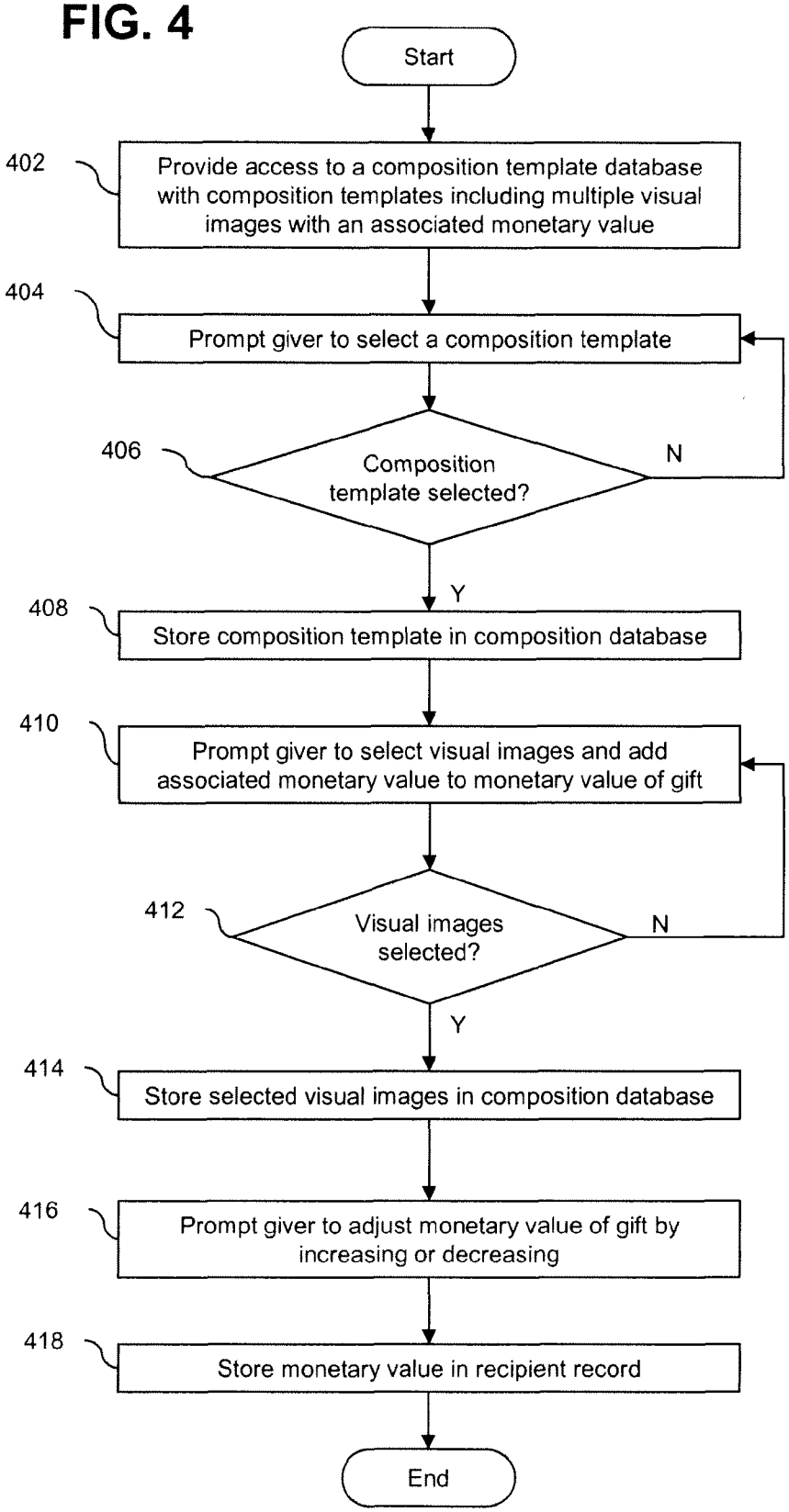
FIG. 4 is a flow chart illustrating a method by which a gift value is determined according to another embodiment of the present invention.

FIG. 4 depicts a flow chart illustrating an optional method by which a gift value is determined 106, as shown in FIG. 1, according to another embodiment of the present invention. This denomination matrix method provides an entertainment aspect to the creation of the composition by the giver. Here, the system provides the giver access to a composition template database including composition templates with multiple visual images with an associated monetary value 402, such as $1 for pictures in group 1, $5 for pictures in group 2, and $10 for pictures in group 3. Next, the system prompts the giver to select a composition template 404. If a composition template is not selected, the system again prompts the giver to select a composition template. Once the composition template is selected 406, the system stores it in the composition database 408. Next, the system prompts the giver to select visual images, and the associated monetary value is added to the monetary value of the gift 410. Once the giver indicates that the visual images have been selected 412 and the desired amount has been reached, the system stores them in the composition database 414. For example, the giver wants to send her niece $26 for her 26th birthday. She would select one picture from group 1, one picture from group 2, and two pictures from group 3 for a total monetary value of the gift of $26.

In another embodiment, by overlaying a randomizer, the giver may spin a slot machine of visual images to select the visual images that will be displayed. Here, elements of fun and chance are added to the giver's experience in creating the gift. Further, this embodiment may also allow the giver the opportunity to obtain specifically desired visual images at a reduced cost or for free. Also, the giver may be charged a fee for each spin.

However, in another embodiment of the present invention, the system prompts the giver to adjust the monetary value of the gift by increasing or decreasing the monetary value 416. For example, the giver may decide to give her niece an additional $100. Therefore, the giver may add $100 to the $26 already included in the monetary value of the gift for a total of $126. The system stores the adjusted monetary value in the recipient record 418 in the recipient account database.

In another embodiment of the present invention, the visual images may be a certain value (e.g., $1) per visual image, the total value of which will be the total value of the monetary gift. In another embodiment of the present invention, the visual images may be purchased for a lesser (e.g., wholesale) amount (e.g., 25 cents each or 5 visual images for a dollar).

In another embodiment of the present invention, composition templates may be offered with no monetary value associated with the visual images. Here, the system may prompt the giver to pay a setup fee to send the composition. However, the giver may also enter a monetary value for a gift.

In another embodiment of the present invention, if the giver uploads visual images from another source for inclusion in the composition, the giver selects and enters a monetary value for a gift. Further, there may be a fee for importing visual images.

In another embodiment of the invention, the giver may designate that the monetary gift be deposited in an anonymous pool, so that the recipient is not notified of the precise amount of the monetary gift. Here, after viewing the composition, a message would inform the recipient that the monetary gift is in an anonymous pool, where the amount remains anonymous and earns interest until an event occurs, such as: a certain number (e.g., six) of deposits have been made into the anonymous pool; the total balance of the anonymous pool exceeds a certain value (e.g., $150); or a certain time period has passed since the first deposit was made into the anonymous pool (e.g., six months). Once one of these conditions has been met, the total balance of the anonymous pool is revealed to the recipient. The anonymous pool may be utilized for pooled gifts, such as office retirement parties or baby showers. For example, one or more givers or the recipient may establish an anonymous pool, such as an event-specific anonymous pool, and invite other givers to contribute to the pool. In another embodiment, the giver can establish a predetermined, near-term date at which the anonymous pool funds would become available to the recipient, such as the actual date of retirement or the date the co-worker's baby is born.

Figure 5:
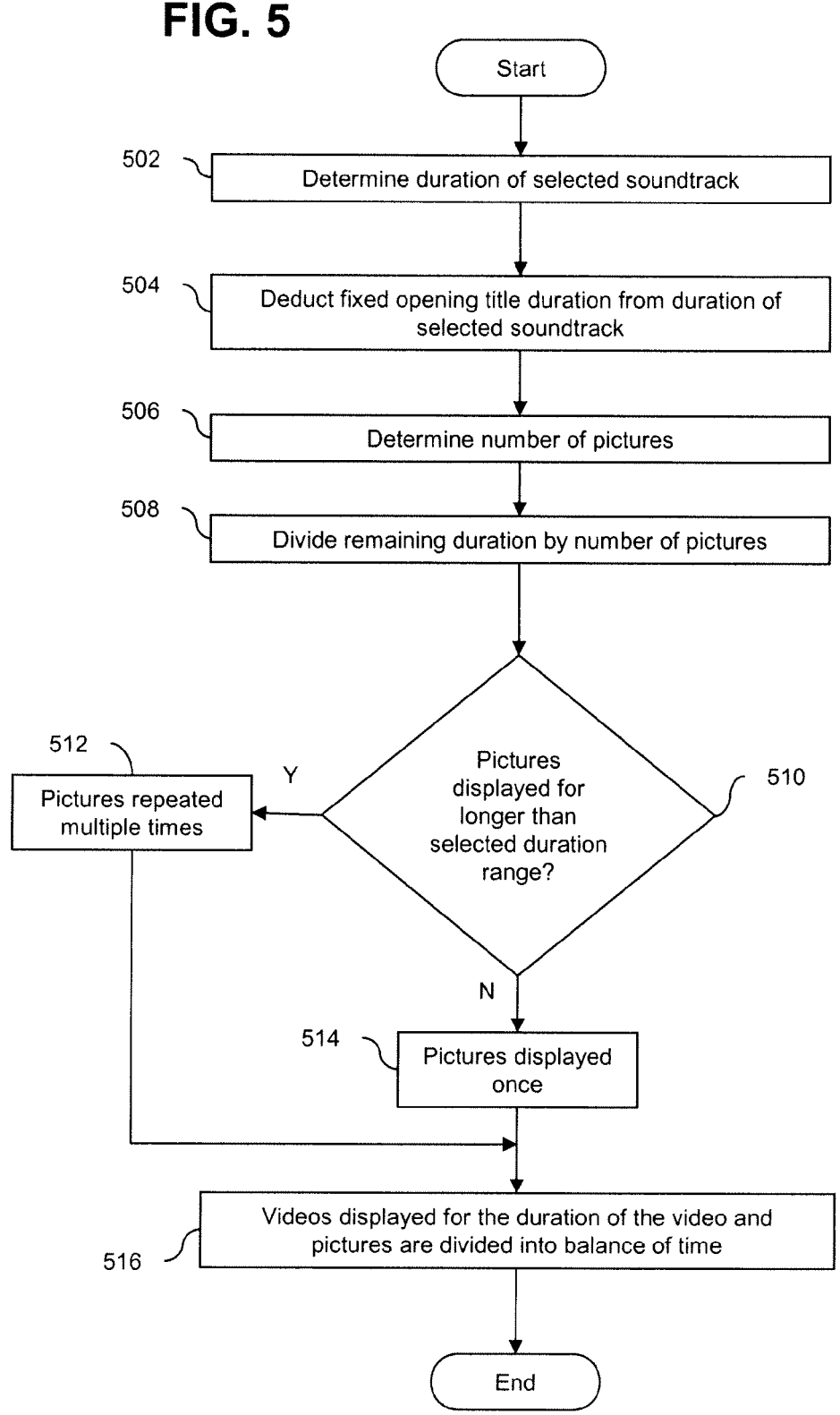
FIG. 5 is a flow chart illustrating a method by which the composition is edited according to another embodiment of the present invention.

FIG. 5 depicts a flow chart illustrating a method by which the composition is edited according to another embodiment of the present invention. Here, the system determines the duration of the selected soundtrack 502. For example, the duration of the selected soundtrack may be 206 seconds. Next, the system deducts a fixed opening title duration from the duration of the selected soundtrack 504. For example, a fixed opening title duration of 10 seconds may be deducted so that the remaining duration is 196 seconds. The system then determines the number of pictures 506 selected (e.g., 10) and divides the remaining duration by the number of pictures 508. In the above example, this results in a duration of 19.6 seconds for each picture.

In one embodiment of the invention, the system may be instructed to allow a minimum and maximum selected duration for each picture. For example, a duration range may be between 5 seconds and 10 seconds. In this embodiment, the system determines whether pictures are displayed for a selected duration range 510. If the pictures are displayed for a duration longer than the selected duration range, the pictures (or picture sequence) are repeated multiple times 512. If the pictures are displayed for a duration within the selected duration range, the pictures are displayed once 514. In the example above, the duration of each picture, 19.6 seconds, is greater than the selected duration range between 5 seconds and 10 second. Therefore, the pictures (or picture sequence) will be repeated a second time so that the duration of each picture is 9.8 seconds, which is within the selected duration range. Here, videos are displayed for the duration of the video, though video duration may be adjusted with time compression and/or expansion techniques, and the pictures are divided into the balance of time 516.

Figure 6:
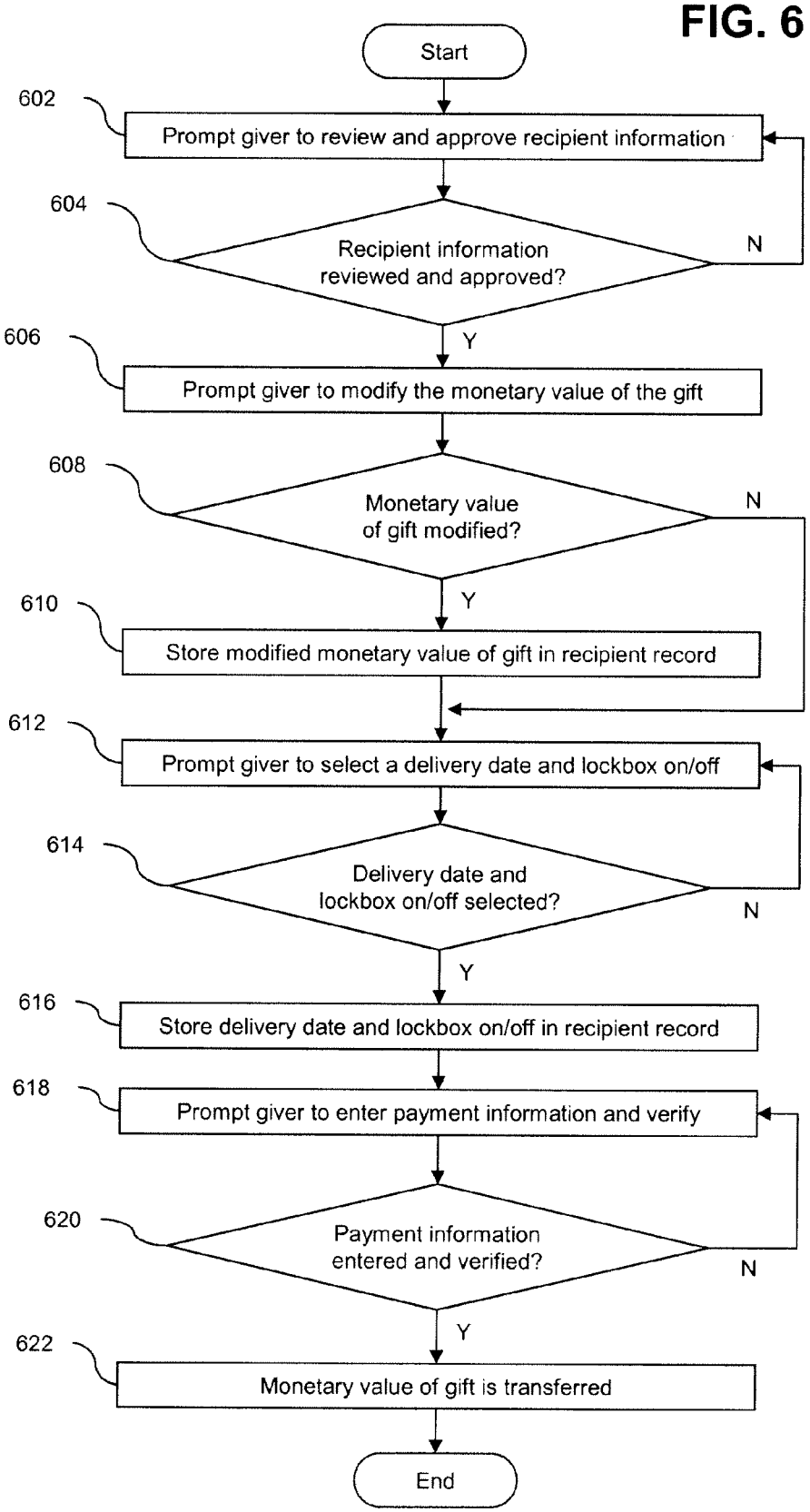
FIG. 6 is a flow chart illustrating a method by which purchase of the gift is completed according to another embodiment of the present invention.

FIG. 6 depicts a flow chart illustrating a method by which a purchase of the gift is completed by the giver designating a monetary source and amount 106, as shown in FIG. 1, according to another embodiment of the present invention. Here, the system may prompt the giver to review and approve recipient information 602 for accuracy prior to actually sending the gift. Once the giver indicates that the recipient information has been reviewed and approved 604, the system may prompt the giver to optionally modify the monetary value of the gift 606, which may be increased or decreased. If the monetary value of the gift is modified 608, the modified monetary value of the gift is stored in the recipient record 610 in the recipient account database.

The system may also prompt the giver to select a delivery date for a notification, such as email, to be delivered, and whether to turn on a lockbox feature 612. The lockbox feature is designed to encourage savings by allowing the giver to restrict access to the monetary value of the gift until some time in the future. When selecting the lockbox feature, the giver may select a specific date to provide access to the monetary value of the gift, or select a specific time period that must pass before providing access to the monetary value of the gift. If the delivery date and lockbox on/off are not selected, the system again prompts the giver to enter this information. Once the delivery date and lockbox on/off are selected 614, they are stored in the recipient record 616 in the recipient account database.

Also, the giver will be prompted to enter and verify payment information 618, such as transaction card or bank account information for an electronic funds transfer, to pay any setup fees and to transfer the monetary value of the gift. Once the payment information is entered and verified 620, the transaction is completed after acceptance by the giver by the system transferring the monetary value of the gift 622 to a system account and an account balance in the recipient record is modified to reflect the additional monetary value. Optionally, the recipient may be able to reject the gift, and the giver will then receive a refund. Further, set-up and transfer fees may occur in the same transaction or in a different transaction.

In another embodiment of the present invention, the payment information, such as transaction card or bank account information for electronic funds transfer, will be authorized prior to selection of a composition template.

In another embodiment of the present invention, interest accumulates in the recipient account based on the monetary value of the gift and a gift interest rate. For example, if the giver completes the creation and purchase of the gift with a monetary value (e.g., $100) a period of time before the actual delivery date of the gift (e.g., 3 months) and the gift interest rate is 2% per 3 months, interest (e.g., $2) will be added to the monetary value of the gift. In another embodiment, if the recipient does not withdraw the gift, the gift will continue to earn interest until it is withdrawn or returned. Here, interest may not be paid to the recipient until the gift is accepted. However, interest may not be paid if the gift is not accepted.

Figure 7:
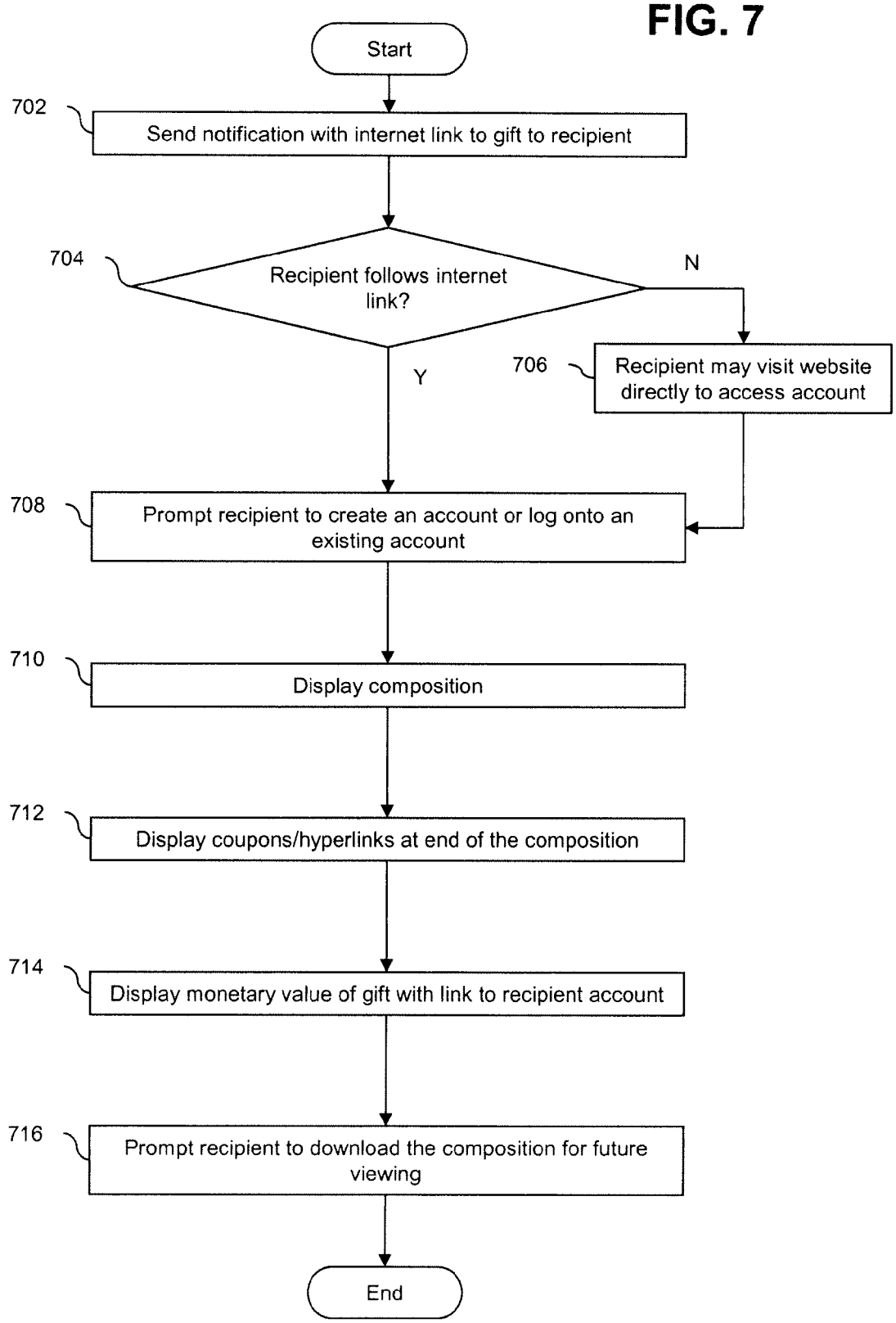
FIG. 7 is a flow chart illustrating a method by which notification of the gift is received and the composition is viewed according to another embodiment of the present invention.

FIG. 7 depicts a method by which notification of the gift is received 108 and the composition is viewed 110, as shown in FIG. 1, according to another embodiment of the present invention. Here, a notification, such as an email, with an internet link to the gift is sent to the recipient 702, which may or may not provide the name of the giver in the body of the email or in the subject line of the email. However, the notification will contain information regarding how to view the gift, which may include an internet link to a website where the gift may be viewed or a website address that may be accessed to view the gift, if the recipient does not follow the internet link in the notification. At the website, the recipient may search for a gift, which may be useful if the recipient inadvertently lost or deleted the notification. If the gift is not viewed, follow-up notifications may be sent, e.g., sent daily for a month. If no response from the recipient is received after a specified time period, the monetary value of the gift may be returned to the recipient.

If the recipient does follow the link in the notification 704 or visit the website 706 to begin the process to access the gift, the system will prompt the recipient to create an account or log onto an existing account 708, which may include selecting and/or entering a user name and password and confirming the information entered by the giver. The system will display the composition 710, and the recipient may control features of the display, such as volume, pause/play, and on/off captions. The system may optionally display coupons/hyperlinks along with the composition 712. Further, the system will display the monetary value of the gift with a link to a recipient account 714. The system may also prompt the recipient to optionally download the composition for future viewing 716 or print a printable version of the composition. The recipient may also optionally send an automatic "thank you" email to the giver that may be personalized.

In another embodiment, the composition may only be available for download for a certain period, for example, 48 hours. Optionally, a copy of the composition may also be delivered to the giver, either when the recipient views the composition or downloads the composition.

In another embodiment of the present invention, recipients may establish a profile page and enter a number of wish-list items (e.g., four) on their profile page, which givers may suggest that the recipient purchase with the gift (e.g., an earmark).

In an embodiment of the present invention, the giver may virtually wrap the present, which may be free or may have a fee. For example, the giver may select a box shape, paper, ribbon, bow(s), and/or other extras (e.g., a flower or a baby rattle) to virtually wrap the gift. The recipient may find points on the displayed gift to click so that some of the wrapping unrolls, rips off, crumples, turns into confetti, gets bitten off, and/or is removed in other ways. Here, the enjoyment and anticipation of unwrapping a real gift is replicated. In an embodiment of the present invention, a cheat button will reveal the next point to click.

Figure 8:
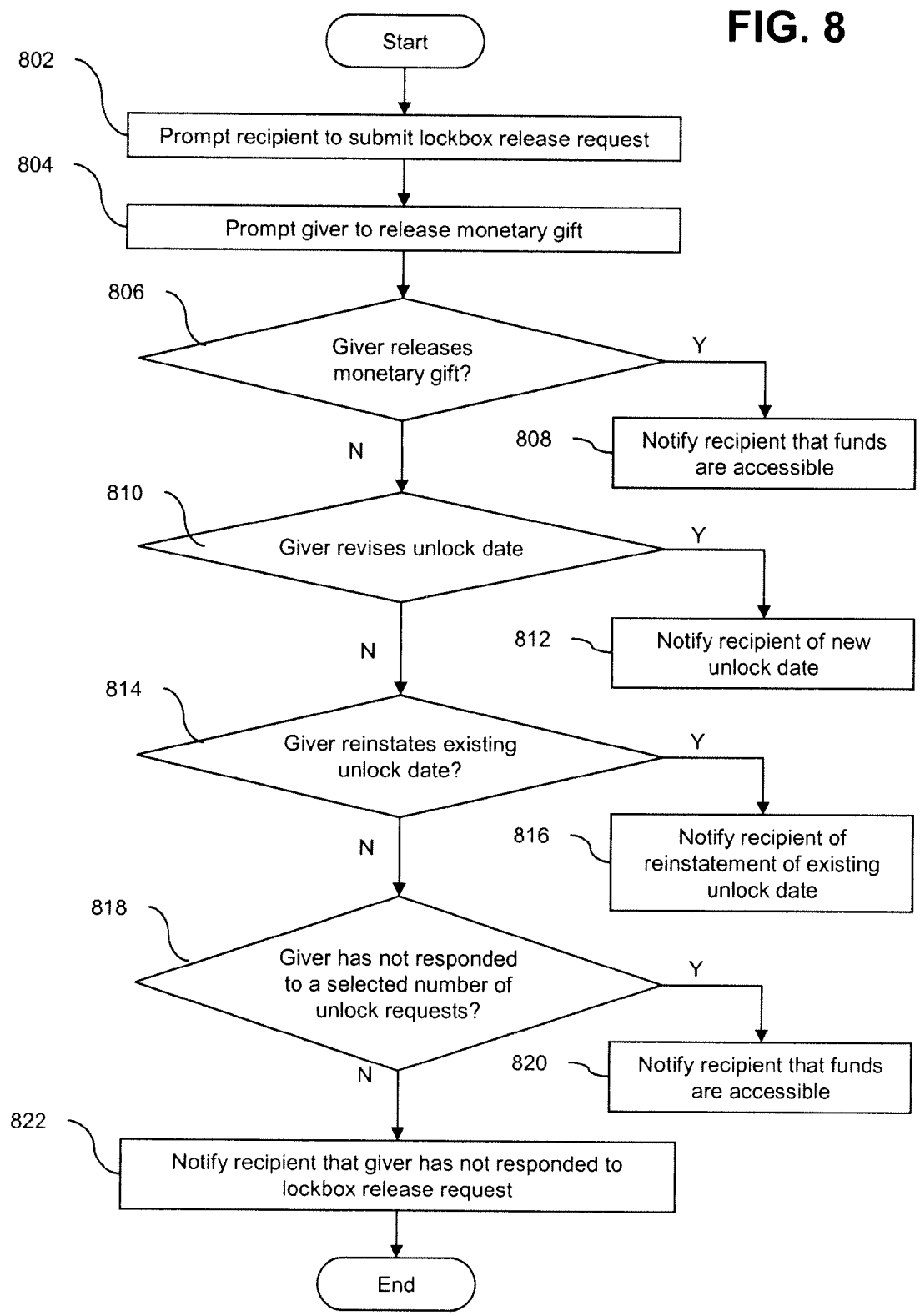
FIG. 8 is a flow chart illustrating a method by which a lockbox release request is processed according to another embodiment of the present invention.

FIG. 8 depicts a flow chart illustrating a method by which a lockbox release request is processed according to another embodiment of the present invention. Here, the system will prompt the recipient to submit a lockbox release request once per given time period 802. For example, a lockbox release request may be submitted once per three months. The system may prompt the giver via email to decide whether to release the monetary gift 804. The giver may respond to the request in one of three methods. First, the giver may release the monetary gift 806, and the recipient may be notified that the funds are accessible 808. Second, the giver may revise the unlock date 810 by either moving the unlock date sooner or later, and the recipient may be notified of the new unlock date 812. Third, the giver may reinstate the existing unlock date 814, and the recipient may be notified of the reinstatement of the existing unlock date 816. If the giver has not responded to a selected number of unlock requests 818 (e.g., three unlock requests), then the funds are released and the recipient may be notified that the funds are accessible 820. If the number of unlock requests is less than a selected number and the giver has not responded, then the recipient is notified that the giver has not responded to the lockbox release request 822.

Figure 9:
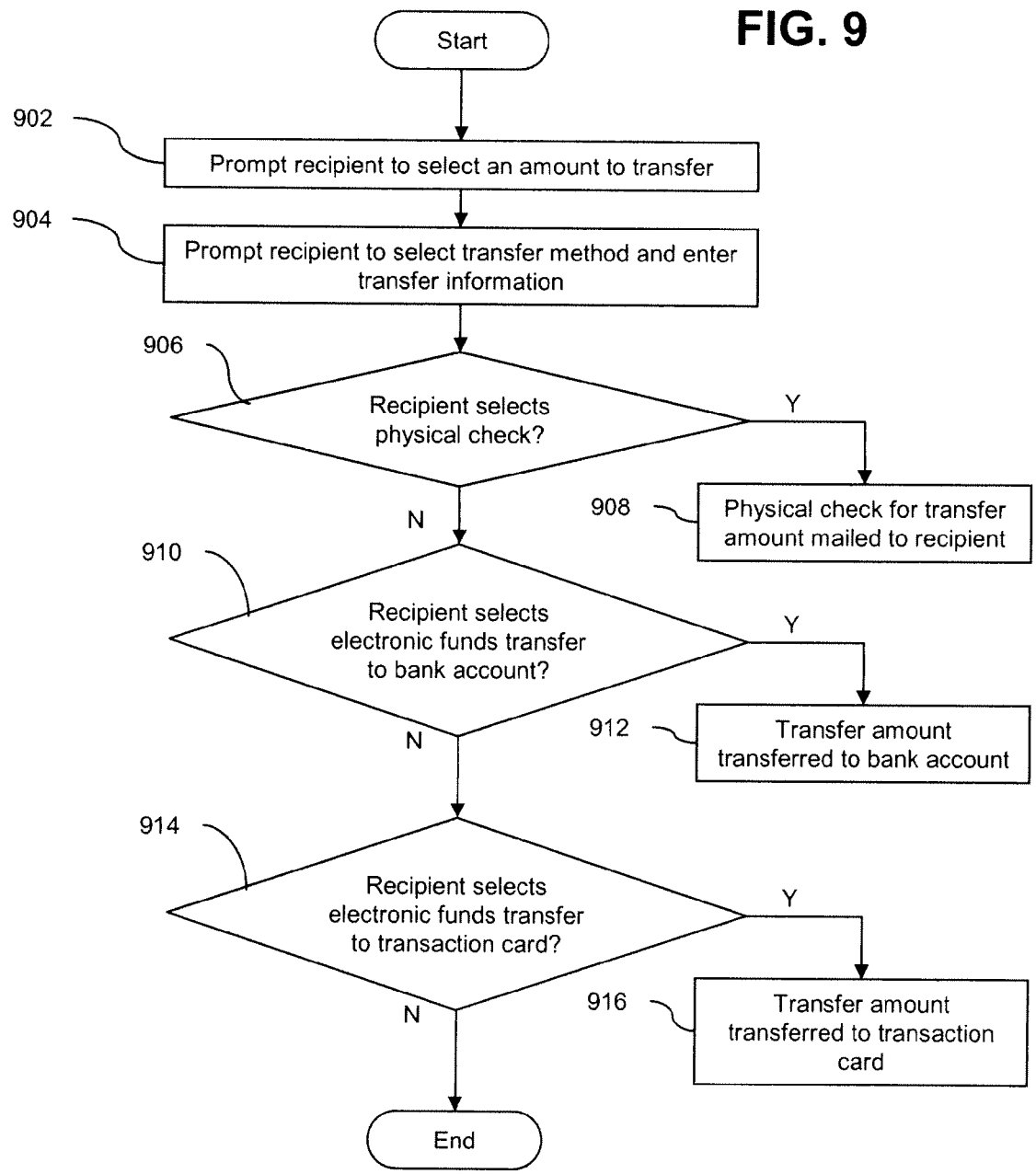
FIG. 9 is a flow chart illustrating a method by which the recipient receives the monetary gift according to another embodiment of the present invention.

FIG. 9 depicts a method by which the recipient receives the monetary gift 112, as shown in FIG. 1, according to another embodiment of the present invention. Here, the system prompts the recipient to select an amount to transfer 902. The system prompts the recipient to select a transfer method and enter transfer information 904. If the recipient selects a physical check 906, then a physical check for the transfer amount is mailed to the recipient 908. Here, the system prompts the recipient to enter a physical mailing address. If the recipient selects an electronic funds transfer to a bank account 910, then the transfer amount is transferred to the bank account 912, which may incur a fee. For example, the recipient enters bank account information, such as the name on the account and routing information. If the recipient selects electronic funds transfer to a transaction card 914, then the transfer amount is transferred to the transaction card 916. Here, the recipient enters transaction card account information, such as the name on the account and the account number. Optionally, the recipient may "re-gift" the monetary value of the gift by applying the monetary value of the gift to another gift for another recipient.

In another embodiment of the present invention, a recipient may receive a monetary gift by designating that the monetary gift be transferred to a non-interest bearing account. A record of the composition and monetary gift may be then saved in an archive record. Once the monetary gift has been transferred, it may then be transferred to a bank account or a transaction card, a physical check, or any combination of thereof. The funds may also be used for direct re-gifting, meaning that they can be applied to the creation of another composition and monetary gift for another recipient.

In another embodiment of the present invention, recipients may designate an alternate recipient in the event of the recipient's death. The recipient may also designate that the monetary value be transferred to the alternate recipient at a certain date, which may be after the death of the recipient.

Figure 10:
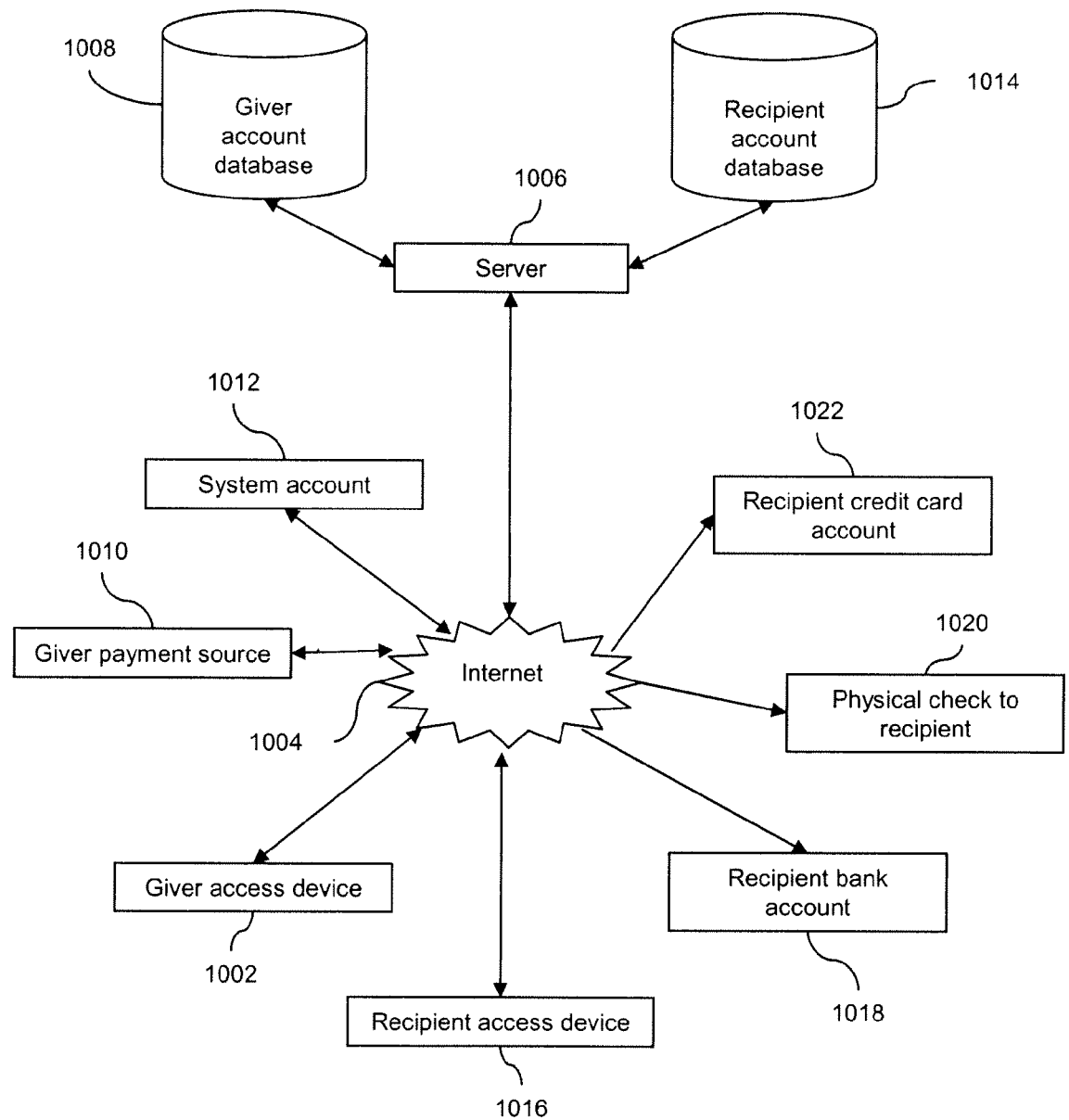
FIG. 10 is a block diagram depicting a system for making financial gifts according to an embodiment of the present invention.

FIG. 10 depicts a system of making financial gifts according to an embodiment of the present invention. The system may include a giver access device 1002 that provides a giver with a link through the internet 1004 to a server 1006 linked to a giver account database 1008. The server 1006 is configured by hardware and/or software to execute the methods illustrated in FIGS. 2 and 6-9.

The giver enters a monetary value of a gift and billing information through the giver access device 1002, which is stored in a giver record in the giver account database 1008. Once the transaction is completed, the monetary value of the gift is transferred from the giver payment source 1010 to the system account 1012 through the internet 1004, and the value is recorded in a recipient record in the recipient account database 1014 that is linked to the internet 1004 through the server 1006. A recipient may access the recipient record in the recipient account database 1014 through a recipient access device 1016 that is linked to the internet 1004 to view the monetary value of the gift. The recipient may request a monetary transfer from the system account 1012 to either a recipient bank account 1018, a physical check to the recipient 1020, or a recipient transaction card account 1022.

For example, the recipient record in the recipient account database 1014 may include the following information:

| Date | From | Amount | Next interest payment | Lockbox Unlock Date | Lockbox release request | Total with interest | Transfer |
|---|---|---|---|---|---|---|---|
| Jul. 8, 2008 | Teddy Smith tsd@aol.com | $35.00 | Oct. 9, 2008 | n/a | n/a | $35.00 | [X] |
| Feb. 6, 2008 | Jonathan Ely | $50.00 | Sep. 6, 2008 | Feb. 6, 2012 | Oct. 10, 2008 | $52.50 | n/a |

-continued

| Date | From | Next Amount | interest payment | Lockbox Unlock Date | Lockbox release request | Total with interest | Transfer |
|---|---|---|---|---|---|---|---|
| Feb. 6, 2008 | jonathan@sbcglobal.net Philip Penopscott philscott@internet.com | $100.00 | Sep. 6, 2008 | n/a | n/a | $105.00 | [ ] |
| Dec. 25, 2007 | Jonathan Ely jonathan@sbcglobal.net | $ 50.00 | Oct. 25, 2008 | Feb. 6, 2012 | Oct. 10, 2008 | $ 55.75 | n/a |
| Dec. 25, 2007 | Edna Penopscott edna100@aol.com | $100.00 | Oct. 25, 2008 | Dec. 25, 2010 | Oct. 10, 2008 | $111.50 | n/a |

Here, the recipient is requesting a transfer of $35.00 (a gift from Teddy Smith).

Optionally, the recipient may archive or store information from the recipient record in the recipient account database 1014, such as the giver, the date, the occasion, and the monetary value for later reference.

Figure 11:
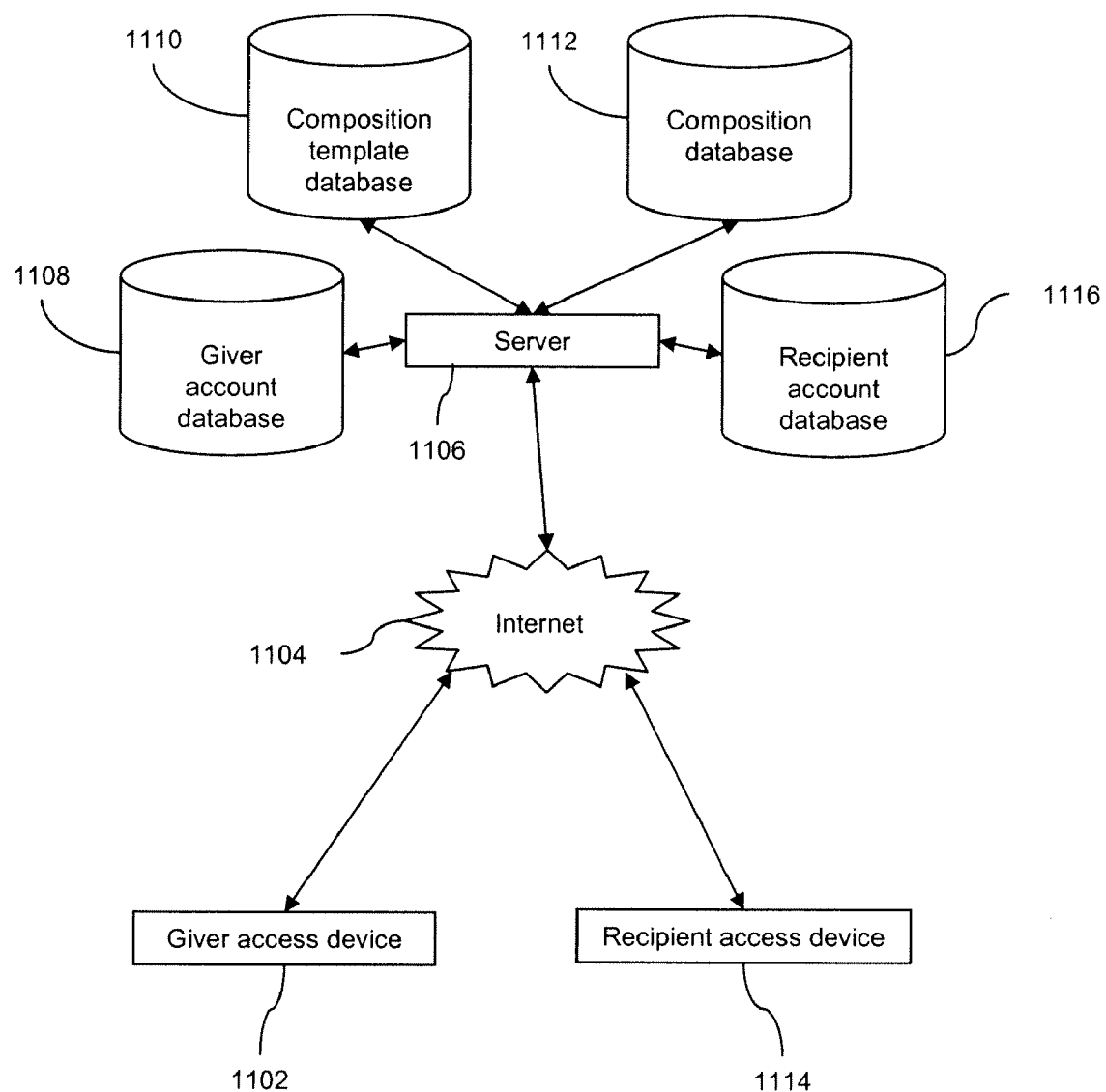
FIG. 11 is a block diagram depicting a system for creating a composition according to another embodiment of the present invention.

FIG. 11 depicts a system of creating a composition according to an embodiment of the present invention. The system may include a giver access device 1102 that provides a giver with a link through the internet 1104 to a server 1106 linked to a giver account database 1108 and a composition template database 1110. The server 1106 is configured by hardware and/or software to execute the methods illustrated in FIGS. 2-5 and 7.

The giver may select a composition template from the composition template database 1110, edit the composition template to create a composition, and store the composition in a composition database 1112, also linked to the server 1106. The system may also include a recipient access device 1114 that provides a recipient with a link through the internet 1104 to the server 1106 that is linked to a recipient account database 1116 to view a list of compositions and the composition database 1112 to view and/or download the composition.

In another embodiment of the present invention, interest is compounded and paid quarterly, and partial quarterly interest is not paid on funds withdrawn between quarters.

In another embodiment of the present invention, composition template pictures may be obtained from and/or sponsored by third parties, such as magazines or film studios.

In another embodiment of the present invention, virtual shopping spree or fashion show composition templates can be obtained from and/or sponsored by retailers, and links may be provided to their websites.

In another embodiment of the present invention, sponsored restaurant menus, themed picture, such as pictures of food items or Australia for an outback-type restaurant, and recipes can provide virtual dining experiences.

In another embodiment of the present invention, sponsors can compete and/or bid for the right to sponsor templates or other aspects of the present invention.

In another embodiment of the present invention, marketing research data may be derived from the activities of both recipients and givers, and this data may be sold to sponsors or provided with sponsorship.

In another embodiment of the present invention, content for the composition may be derived from sources, such as social networking internet sites or internet sites that provide a forum to post video and/or audio content.

Although limited embodiments of the method and system for making financial gifts have been specifically described and illustrated herein, many modifications and variations will be apparent to those skilled in the art, such as modifying the order of steps, or deleting or adding steps. Accordingly, it is to be understood that the method and system for making financial gifts according to principles of this invention may be embodied other than as specifically described herein. The invention is also defined in the following claims.

What is claimed is:

1. A computer-implemented method for electronic gift giving, the method comprising:
   providing an internet site for access by a giver via a giver device;
   prompting the giver to enter giver identification information;
   storing the giver identification information in a data store;
   prompting the giver to enter recipient information;
   storing the recipient information in the data store;
   prompting the giver to select from a plurality of composition templates;
   creating a composition based on the selected composition template;
   prompting the giver to enter a value of a monetary gift;
   storing the entered value in association with the created composition for delivery to a recipient;
   determining whether a lockbox feature has been selected for the monetary gift;
   restricting access to the monetary gift until an unlock date if the lockbox feature has been selected;
   receiving a lockbox release request from the recipient;
   forwarding the lockbox release request to the giver; and
   releasing the monetary gift, revising the unlock date, or reinstating the unlock date, in response to a command by the giver.

2. The method of claim 1, wherein interest accrues based on the value of the monetary gift.

3. The method of claim 1, wherein at least one sponsor pays a fee for a product placement or an advertising message to appear in the composition.

4. The method of claim 1, wherein the giver increases the value of the monetary gift by including sponsored links and offers.

5. The method of claim 1, wherein a composition template is suggested based on demographic information.

6. The method of claim 1, wherein the composition template comprises a puzzle, stop-motion creation of a virtual gift, and/or a scenic environment with visual elements.

7. The method of claim 1 further comprising:
   sending a notification to the recipient;
   displaying the composition and the value of the monetary gift on a recipient device; and
   providing the recipient access to the monetary gift.

8. The method of claim 7, wherein the notification includes an Internet link for accessing the composition.

9. The method of claim 1, further comprising:
   prompting the recipient to select an amount to transfer;
   prompting the recipient to select a transfer destination, wherein the transfer destination is selected from the group consisting of a bank account, a physical check, and a transaction card account; and authorizing transfer of the amount to the transfer destination.

10. The method of claim 1, wherein the creating of the composition includes customizing the selected composition template via one or more of visual images and audio elements.

11. The method of claim 1, wherein each composition template includes a plurality of visual images with an associated monetary value, and the method further comprises:
prompting the giver to select one or more of the visual images, wherein a value of the monetary gift is the sum of the monetary values associated with the selected visual images.

12. The method of claim 1, wherein the creating of the composition comprises:
determining a soundtrack duration of a selected soundtrack;
determining an opening title duration;
determining a number of selected visual images; and
determining a visual image display duration based on at least the number of selected visual images, the opening title duration, and the soundtrack duration.

13. The method of claim 12, further comprising:
comparing the visual image display duration with a predetermined range; and
displaying the visual images multiple times if the visual image display duration is greater than the predetermined range.

14. A gift giving system comprising:
an Internet interface;
a giver account database accessed through the Internet interface by a giver and storing giver information;
a recipient account database accessed through the Internet interface by a recipient and storing recipient information; and
a composition template database storing a plurality of composition templates; and
a server coupled to the giver account, recipient account, and composition template databases, wherein the server is configured to create an electronic gift including a customized composition based on a selection of one of the plurality of composition templates, and a monetary value for the gift, and deliver the electronic gift to the recipient over the Internet interface; and
wherein the server is further configured to:
determine whether a lockbox feature has been selected for the monetary gift;
restrict access to the monetary gift until an unlock date if the lockbox feature has been selected;
receive a lockbox release request from the recipient;
forward the lockbox release request to the giver; and
release the monetary gift, revise the unlock date, or reinstate the unlock date, in response to a command by the giver.

15. The system of claim 14, wherein the composition includes one or more of visual images and audio elements.

16. The system of claim 14, wherein:
each composition template includes a plurality of visual images with an associated monetary value; and
the server is further configured to prompt the giver to select one or more of the visual images, wherein the monetary value of the gift is the sum of the monetary values associated with the selected visual images.

17. The system of claim 14, wherein the server is further configured to:
determine a soundtrack duration of a selected soundtrack;
determine an opening title duration;
determine a number of selected visual images;
determine a visual image display duration based on the number of selected visual images, the opening title duration, and the soundtrack duration;
compare the visual image display duration with a predetermined range; and
display the visual images multiple times if the visual image display duration is greater than the predetermined range.

18. The system of claim 14, wherein the server is further configured to:
prompt the recipient to select an amount to transfer;
prompt the recipient to select a transfer destination, wherein the transfer destination is selected from the group consisting of a bank account, a physical check, and a transaction card account; and
authorize transfer of the amount to the transfer destination.

19. A server for a gift giving system, the server comprising:
a processor; and
a memory operably coupled to the processor storing program instructions therein,
the processor being operable to execute the program instructions, the program instructions including:
providing an Internet site for access by a giver via a giver device;
prompting the giver to enter giver identification information;
storing the giver identification information in a device store;
prompting a giver to enter recipient information;
storing the recipient information in the device store;
prompting the giver to select from a plurality of composition templates;
creating a composition based on the selected composition template; prompting the giver to enter a value of a monetary gift; and
storing the entered value in association with the created composition for delivery to a recipient; and
wherein the program instructions further comprise:
determining whether a lockbox feature has been selected for the monetary gift;
restricting access to the monetary gift until an unlock date if the lockbox feature has been selected;
receiving a lockbox release request from the recipient;
forwarding the lockbox release request to the giver; and
releasing the monetary gift, revising the unlock date, or reinstating the unlock date, in response to a command by the giver.

20. The server of claim 19, wherein the program instructions further comprise:
sending a notification to a recipient;
displaying the composition and a notification of the value of the monetary gift on a recipient device; and
providing access to the monetary gift by the recipient.

21. The server of claim 20, wherein the notification includes an Internet link for accessing the composition.

22. The server of claim 19, wherein the program instructions further comprise:
prompting the recipient to select an amount to transfer;
prompting the recipient to select a transfer destination, wherein the transfer destination is selected from the group consisting of a bank account, a physical check, and a transaction card account; and
authorizing transfer of the amount to the transfer destination.

23. The server of claim 19, wherein the creating of the composition includes customizing the selected composition template via one or more of visual images and audio elements.

24. The server of claim 19, wherein each composition template includes a plurality of visual images with an associated monetary value, and the program instructions further comprise:
prompting the giver to select one or more of the visual images, wherein a value of the monetary gift is the sum of the monetary values associated with the visual images.

25. The server of claim 19, wherein the creating of the composition comprises:
determining a soundtrack duration of a selected soundtrack;
determining an opening title duration;
determining a number of selected visual images;
determining a visual image display duration based on the number of selected visual images, the opening title duration, and the soundtrack duration;
comparing the visual image display duration with a predetermined range;
determining a number of times to display each of the visual images based on the comparison; and
displaying the visual images multiple times if the visual image display duration is greater than the predetermined range.

26. A computer-implemented method for electronic gift giving, the method comprising:
providing an internet site for access by a giver via a giver device;
prompting the giver to enter giver identification information;
storing the giver identification information in a data store;
prompting the giver to enter recipient information;
storing the recipient information in the data store;
prompting the giver to enter a value of a monetary gift;
storing the entered value for delivery to a recipient;
restricting access to the monetary gift until an unlock date if a lockbox feature has been implemented;
receiving a lockbox release message; and
releasing the monetary gift, revising the unlock date, or reinstating the unlock date, in response to a command by the giver.

27. The method of claim 26, wherein interest accrues based on the value of the monetary gift.

28. The method of claim 26, wherein at least one sponsor pays a fee for a product placement or an advertising message.

29. The method of claim 26, wherein the gift increases in value by inclusion of sponsored links and offers.

30. The method of claim 26, further comprising:
prompting the recipient to select an amount to transfer;
prompting the recipient to select a transfer destination; and
authorizing transfer of the amount to the transfer destination.

31. A gift giving system comprising:
an Internet interface;
a giver account database accessed through the Internet interface by a giver and storing giver information;
a recipient account database accessed through the Internet interface by a recipient and storing recipient information; and
a server coupled to the giver account, and recipient account, wherein the server is configured to create an electronic gift, and a monetary value for the gift, and deliver the electronic gift to the recipient over the Internet interface; and
wherein the server is further configured to:
determine whether a lockbox feature has been selected for the monetary gift;
restrict access to the monetary gift until an unlock date if the lockbox feature has been selected;
receive a lockbox release message; and
release the monetary gift, revise the unlock date, or reinstate the unlock date, in response to a command by the giver.

32. The system of claim 31, wherein the server is further configured to:
prompt the recipient to select an amount to transfer;
prompt the recipient to select a transfer destination; and
authorize transfer of the amount to the transfer destination.

33. A server for a gift giving system, the server comprising:
a processor; and
a memory operably coupled to the processor storing program instructions therein,
the processor being operable to execute the program instructions, the program instructions including:
providing an Internet site for access by a giver via a giver device;
prompting the giver to enter giver identification information;
storing the giver identification information in a device store;
prompting a giver to enter recipient information;
storing the recipient information in the device store;
prompting the giver to enter a value of a monetary gift; and
storing the entered value for delivery to a recipient; and
wherein the program instructions further comprise:
determining whether a lockbox feature has been selected for the monetary gift;
restricting access to the monetary gift until an unlock date if the lockbox feature has been selected;
receiving a lockbox release message from the recipient; and
releasing the monetary gift, revising the unlock date, or reinstating the unlock date, in response to a command by the giver.

34. The server of claim 33, wherein the program instructions further comprise:
prompting the recipient to select an amount to transfer;
prompting the recipient to select a transfer destination; and
authorizing transfer of the amount to the transfer destination.

* * * * *